US012585040B2

(12) United States Patent
Chatar et al.

(10) Patent No.: US 12,585,040 B2
(45) Date of Patent: Mar. 24, 2026

(54) MACHINE LEARNING SYNTHESIS OF FORMATION EVALUATION DATA

(71) Applicant: Schlumberger Technology Corporation, Sugar Land, TX (US)

(72) Inventors: Crispin Chatar, Katy, TX (US); Priya Mishra, Menlo Park, CA (US); Cheolkyun Jeong, Sugar Land, TX (US); Velizar Vesselinov, Sugar Land, TX (US)

(73) Assignee: SCHLUMBERGER TECHNOLOGY CORPORATION SUGAR, Sugar Land, TX (US)

( * ) Notice: Subject to any disclaimer, the term of this patent is extended or adjusted under 35 U.S.C. 154(b) by 462 days.

(21) Appl. No.: 18/250,544

(22) PCT Filed: Oct. 29, 2021

(86) PCT No.: PCT/US2021/057196
§ 371 (c)(1),
(2) Date: Apr. 26, 2023

(87) PCT Pub. No.: WO2022/094176
PCT Pub. Date: May 5, 2022

(65) Prior Publication Data
US 2023/0408723 A1 Dec. 21, 2023

Related U.S. Application Data

(60) Provisional application No. 63/198,633, filed on Oct. 30, 2020.

(51) Int. Cl.
*G01V 99/00* (2024.01)

(52) U.S. Cl.
CPC .......... *G01V 99/00* (2013.01); *G01V 2200/16* (2013.01)

(58) Field of Classification Search
None
See application file for complete search history.

(56) References Cited

U.S. PATENT DOCUMENTS

2012/0222901 A1* 9/2012 Pei ........................ E21B 49/003
175/56
2014/0116776 A1 5/2014 Marx et al.
(Continued)

FOREIGN PATENT DOCUMENTS

CA 3122686 C 10/2023

OTHER PUBLICATIONS

Extended Search Report issued in European Patent Application No. 21887584.7 dated Sep. 3, 2024, 7 pages.
(Continued)

*Primary Examiner* — Lina Cordero
(74) *Attorney, Agent, or Firm* — Jeffrey D. Frantz

(57) ABSTRACT

An apparatus and method utilize a trained machine learning model to synthesize formation evaluation data such as formation tops and LWD logs. In some instances, the synthesis of formation evaluation data may further be based upon drilling mechanics data collected during drilling, thus effectively enabling formation evaluation data to be synthesized primarily based upon surface measurements collected in real time, and in many cases without the need for collecting downhole measurements during drilling. In addition, in some instances, a machine learning model implemented as a generative adversarial network (GAN) may be used to synthesize formation evaluation data, with drilling mechanics data collected during drilling also used in some instances.

21 Claims, 8 Drawing Sheets

(56)                    References Cited

U.S. PATENT DOCUMENTS

| | | | |
|---|---|---|---|
| 2015/0300151 A1 | 10/2015 | Mohaghegh | |
| 2018/0349526 A1* | 12/2018 | Atsmon | G06N 3/094 |
| 2019/0169986 A1 | 6/2019 | Storm, Jr. et al. | |
| 2019/0277135 A1 | 9/2019 | Zha | |
| 2020/0183047 A1* | 6/2020 | Denli | G06N 3/094 |
| 2020/0188732 A1* | 6/2020 | Kruger | G06F 3/0346 |
| 2020/0190957 A1 | 6/2020 | Madasu et al. | |
| 2020/0340351 A1 | 10/2020 | Harvey | |
| 2021/0089897 A1* | 3/2021 | Zhang | G06N 3/084 |
| 2021/0140298 A1* | 5/2021 | Bakulin | G06F 18/24 |
| 2022/0075915 A1* | 3/2022 | Vallabhaneni | G01V 1/302 |
| 2022/0351403 A1* | 11/2022 | Jiang | G06T 7/70 |

OTHER PUBLICATIONS

Osarogiagbon, A. U. et al., "Gamma ray log generation from drilling parameters using deep learning", Journal of Petroleum Science and Engineering, 2020, 195, 17 pages.
Search Report and Written Opinion of International Patent Application No. PCT/US2021/057196 dated Feb. 21, 2022, 10 pages.
International Preliminary Report on Patentability of International Patent Application No. PCT/US2021/057196 dated May 11, 2023, 7 pages.

* cited by examiner

300

MACHINE LEARNING SYNTHESIS OF FORMATION EVALUATION DATA

CROSS-REFERENCE TO RELATED APPLICATIONS

The present application is a National Stage Entry of International Patent Application No. PCT/US2021/057196, filed on Oct. 29, 2021, which claims priority benefit of U.S. Provisional Application 63/198,633, filed Oct. 30, 2020, the entirety of which is incorporated herein and should be considered part of this specification.

BACKGROUND

Wellbores are conventionally drilled using a drill string to access hydrocarbon bearing formations, such as crude oil and/or natural gas. The drill string generally includes a series of drill pipe threaded together and a bottom hole assembly (BHA). The BHA includes at least a drill bit and may further include components that turn the drill bit at the bottom of the wellbore. The BHA may also include measurement-while-drilling (MWD)/logging-while-drilling (LWD) tools and other specialized equipment that enable directional drilling. Additional control over drilling may be provided in response to various drilling mechanics data that is also collected during drilling, e.g., weight-on-bit (WOB), torque on bit, revolutions per minute (RPM), shock, temperature, caliper, mud pressure, etc.

LWD tools may be used, for example, to generate formation evaluation logs containing data related to one or more properties of a formation as a function of depth. Many types of formation evaluation logs, e.g., resistivity, acoustic, and nuclear, may be recorded using LWD tools, and the data collected by such tools may be used to control the drilling process, e.g., to follow a desired trajectory as determined by a well plan.

LWD tools, however, are expensive to use, and can have an appreciable impact on the cost of drilling a wellbore. In some cases, the added costs of using LWD can even be a determining factor as to the viability of a drilling project.

SUMMARY

The herein-described embodiments address these and other problems associated with the art by providing an apparatus and method that utilize a trained machine learning model to synthesize formation evaluation data such as formation tops and LWD logs. In some instances, the synthesis of formation evaluation data may further be based upon drilling mechanics data collected during drilling, thus effectively enabling formation evaluation data to be synthesized primarily based upon surface measurements collected in real time, and in many cases without the need for collecting downhole measurements during drilling. In addition, in some instances, a machine learning model implemented as a generative adversarial network (GAN) may be used to synthesize formation evaluation data, with drilling mechanics data collected during drilling also used in some instances.

Therefore, consistent with one aspect of the invention, a method of synthesizing formation evaluation data may include receiving drilling mechanics data collected using one or more surface sensors while drilling a well, and synthesizing formation evaluation data for the well from the received drilling mechanics data by processing the received drilling mechanics data with a machine learning model trained using historical drilling mechanics data and formation evaluation data collected from one or more similar wells.

In some embodiments, the drilling mechanics data includes a rate of rotation of a drill string, a torque exerted on the drill string, a rate of penetration, a weight on a drill bit, a depth of the drill bit, a surface torque, and/or a surface revolutions per minute. Also, in some embodiments, synthesizing the formation evaluation data includes synthesizing one or more logging while drilling (LWD) logs and/or synthesizing one or more formation tops. Further, in some embodiments, synthesizing the formation evaluation data includes synthesizing pressure, temperature, wellbore trajectory, resistivity, porosity, density, inclination, fluid and/or mineral composition, elemental capture spectroscopy, imaging, lithology, permeability, sonic velocity, and/or gamma ray data. Some embodiments may further include drilling the well without collecting real-time data from an LWD tool.

In some embodiments, the trained machine learning model includes one or more trained neural networks. In addition, in some embodiments, the trained machine learning model includes a generative adversarial network (GAN). In some embodiments, the trained machine learning model includes a conditional GAN, and the generative adversarial network (GAN) receives the drilling mechanics data as a condition.

Some embodiments may also include performing well planning using the synthesized formation evaluation data. In addition, some embodiments may also include controlling drilling of the well using the synthesized formation evaluation data.

Consistent with another aspect of the invention, a method of synthesizing formation evaluation data may include receiving drilling mechanics data and formation evaluation data from one or more wells, training a machine learning model using the received drilling mechanics data and formation evaluation data, receiving drilling mechanics data collected using one or more surface sensors while drilling a well, and synthesizing formation evaluation data for the well from the received drilling mechanics data collected using the one or more surface sensors by processing the received drilling mechanics data collected using the one or more surface sensors with the trained machine learning model.

Consistent with another aspect of the invention, a method of synthesizing formation evaluation data for a well may include receiving formation evaluation data collected from one or more similar wells to the well for which formation evaluation data is to be synthesized, training a generative adversarial network (GAN) machine learning model using the received formation evaluation data, and synthesizing formation evaluation data for the well using the trained GAN machine learning model.

Moreover, in some embodiments, training the GAN machine learning model includes training the GAN machine learning model further using drilling mechanics data. In some embodiments, the drilling mechanics data includes drilling mechanics data collected using one or more surface sensors while drilling the well. Moreover, in some embodiments, the GAN is a conditional GAN, and the drilling mechanics data is provided as a condition to the conditional GAN. In some embodiments, the drilling mechanics data includes a rate of rotation of a drill string, a torque exerted on the drill string, a rate of penetration, a weight on a drill bit, a depth of the drill bit, a surface torque, and/or a surface revolutions per minute. In addition, in some embodiments, synthesizing the formation evaluation data includes synthesizing one or more logging while drilling (LWD) logs. In some embodiments, synthesizing the formation evaluation data includes synthesizing pressure, temperature, wellbore trajectory, resistivity, porosity, density, inclination, fluid and/or mineral composition, elemental capture spectroscopy, imaging, lithology, permeability, sonic velocity, and/or gamma ray data.

Moreover, in some embodiments, the GAN includes a generator network and a discriminator network, the generator network receives random noise as an input and generates synthetic formation evaluation data, and the discriminator network receives the synthetic formation evaluation data generated by the generator network and the received formation evaluation data.

In addition, some embodiments may further include filtering and/or preprocessing the received formation evaluation data provided to the discriminator network. In some embodiments, the GAN network is a conditional GAN network, and each of the generator network and the discriminator network receives drilling mechanics data collected using one or more surface sensors while drilling the well. In addition, in some embodiments, the one or more similar wells includes include a plurality of offset wells proximate to the well for which formation evaluation data is to be synthesized.

Consistent with another aspect of the invention, an apparatus may include a memory, and one or more processors coupled to the memory and configured to execute instructions that are stored in the memory and that, when executed, perform any one of the aforementioned methods. Consistent with another aspect of the invention, a computer readable medium may store machine-readable instructions that, when executed by one or more processors, perform any one of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
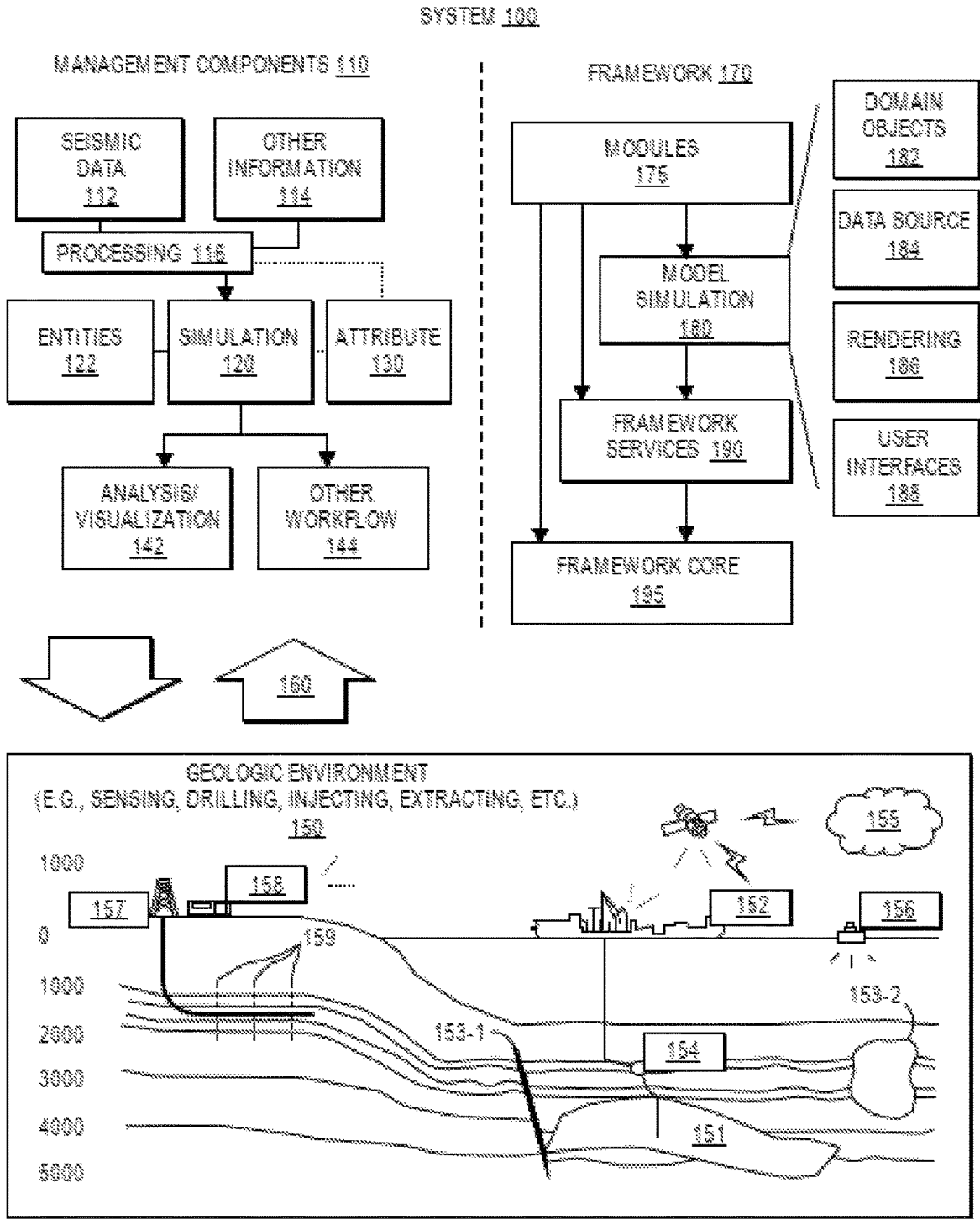
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
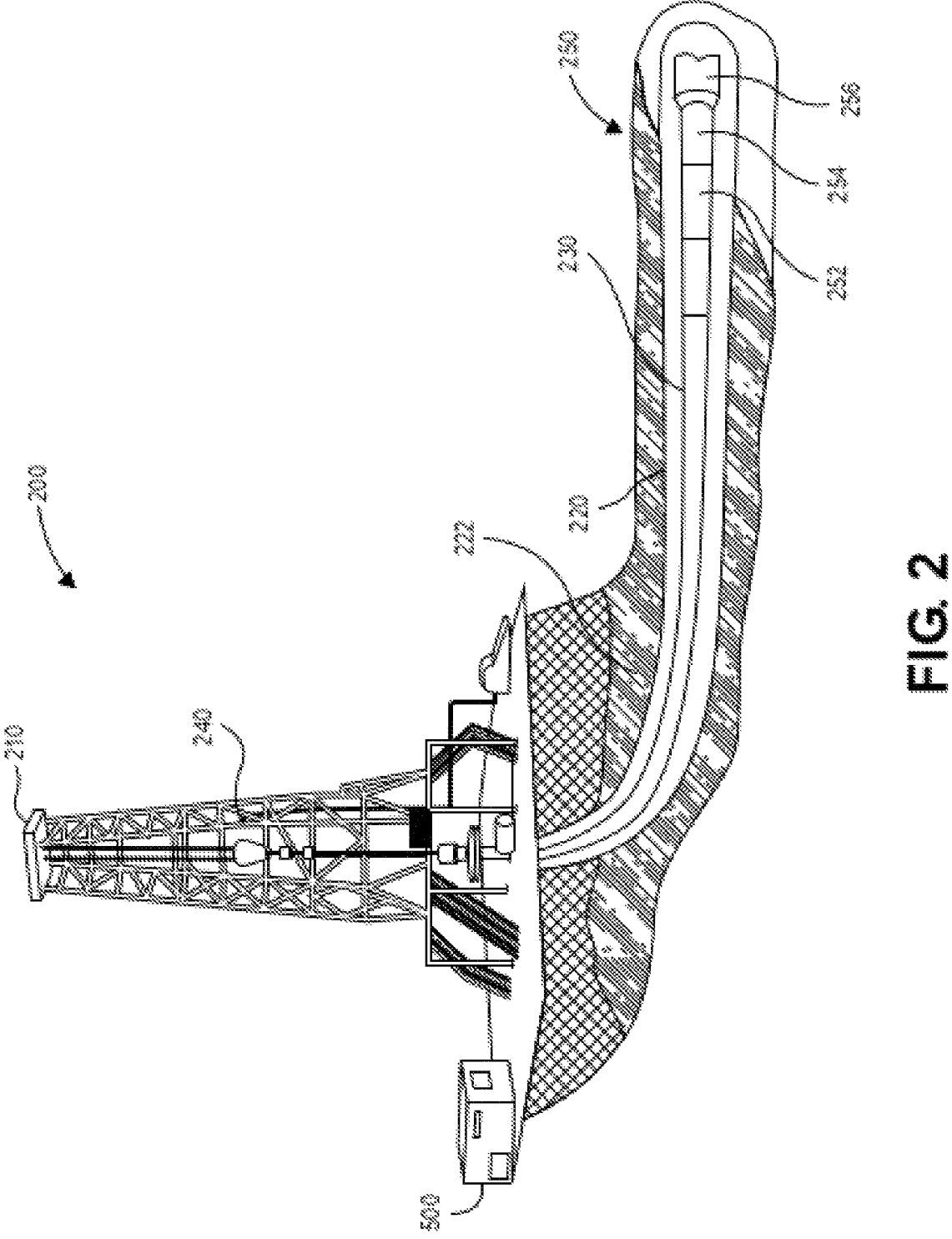
FIG. 2 illustrates a schematic view of a wellsite, according to an embodiment.

FIG. 2 illustrates a schematic view of a wellsite 200, according to an embodiment. The wellsite 200 may include a rig 210 positioned above a wellbore 220 that is formed in a subterranean formation 222. A tubular string 230 may extend from the rig 210 into the wellbore 220. In one embodiment, the tubular string 230 may be or include a drill string made of a plurality of drill pipe segments.

One or more surface sensors (one is shown: 240) may be positioned at the surface (e.g., on the rig 210). The surface sensor 240 may be configured to measure various drilling mechanics data, also referred to herein as surface physical properties, such as a rate of rotation of the tubular string 230 at the surface. More particularly, the surface sensor 240 may be configured to measure the rate of rotation imparted to an upper portion of the tubular string 230 by the rig 210 (e.g., by a rotary table and/or kelly of the rig 210). The drilling mechanics data measured by the surface sensor 240 may also include a torque exerted on the upper portion of the tubular string 230 by the rig 210 (e.g., by the rotary table and/or kelly). The drilling mechanics data may also include a rate of penetration (ROP) and/or a surface weight on a drill bit 256 (SWOB). The drilling mechanics data may also include a depth of the drill bit 256, surface torque (STOR), surface revolutions per minute (RPM), and/or others data related to drilling conditions and/or formation environments.

A downhole tool 250 may be coupled to an end of the tubular string 230 in the wellbore 220. The downhole tool 250 may be or include a measurement-while drilling (MWD) tool 252, a logging-while-drilling (LWD) tool 254, and the drill bit 256. The MWD 252 and/or the LWD 254 may be configured to measure formation evaluation data, also referred to herein as downhole properties, as the drill bit 256 drills the wellbore 220 farther into the subterranean formation 222. For example, the downhole tool 250 (e.g., the MWD 252) may be configured to measure downhole physical properties, such as pressure, temperature, and wellbore trajectory in three-dimensional space. The downhole physical properties may also include a rate of rotation of the downhole tool 250 (e.g., in RPM). The downhole tool 250 (e.g., the LWD 254) may also be configured to measure downhole formation evaluation data, such as resistivity, porosity, density, inclination, fluid and/or mineral composition, elemental capture spectroscopy, imaging, lithology, permeability, sonic velocity, gamma ray data, etc. The formation evaluation data in some embodiments may be in the form of one or more logs, although other manners of organizing and/or storing the formation evaluation data may be used in other embodiments.

As noted above, LWD tools can be expensive to use, and may not be economically justified for some drilling projects, particularly high volume projects containing numerous wells in the same geographical region, which have been found to have lower costs and smaller margins. Nonetheless, the formation evaluation data generated by such tools may provide useful information for use in drilling or for other purposes, including information such as formation tops and various LWD logs. Formation evaluation data may be used, for example, to assist with steering the drill, defining well placement, optimizing casing placement, optimizing coring location, identifying pressure-depleting formations, and predicting potential drilling hazards, among other uses.

In some embodiments consistent with the invention, however, machine learning techniques may be used to synthesize formation evaluation data based at least in part upon drilling mechanics data, thus effectively enabling downhole properties to be synthesized primarily based upon surface measurements collected in real time and input to a machine learning model trained from offset well data, e.g., formation evaluation data and drilling mechanics data collected during drilling and correlated by depth or offset. The training may be performed, for example, using a set of "similar" wells, e.g., one or more wells drilled in a nearby location and from which both drilling mechanics data and formation evaluation data has been collected, such that additional wells may be drilled with the drilling mechanics data input to the model to synthesize corresponding formation evaluation data, and in some instances, without the need for collecting downhole measurements.

A trained model may be used to define relationships between drilling mechanics and formation evaluation data, thereby enabling, for example, prediction of formation tops or other formation data (e.g., resistivity, porosity, density, inclination, fluid and/or mineral composition, elemental capture spectroscopy, imaging, lithology, permeability, sonic velocity, gamma ray data, etc.) during drilling. In some embodiments, for example, drilling mechanics data from nearest recent offset wells and their respective formation evaluation data (e.g., gamma ray, resistivity and/or neutron density) may be fed into a machine learning model. The model may then be trained to match specific formation changes by matching the response of the drilling mechanics data to the changes in the formations (as described by the formation evaluation data). The trained model may then be used while drilling to 1) predict upcoming formations based on the response of the tools and/or 2) once the formation top has been drilled, generate a synthetic log that can be used qualitatively and for correlations.

Figure 3:
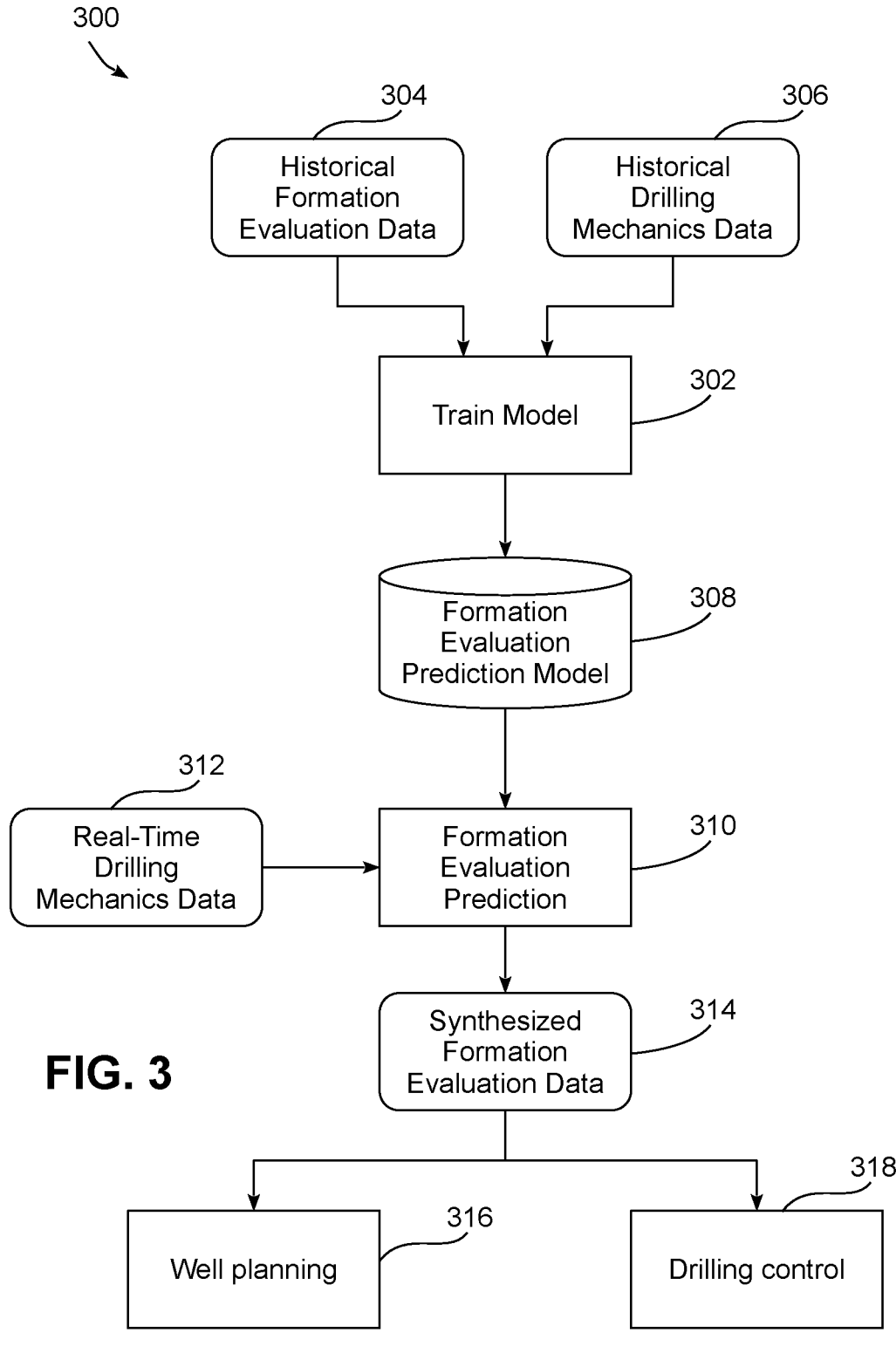
FIG. 3 illustrates a block diagram of a system for synthesizing formation evaluation data, according to an embodiment.

FIG. 3 illustrates an example system 300 for implementing some embodiments of the invention. System 300 may include a train model component 302 that may receive as input historical formation evaluation data 304 and historical drilling mechanics data 306 collected form one or more "similar" wells, e.g., wells that have been drilled in the vicinity of a planned well for which it is desirable to synthesize formation evaluation data. The historical data 304, 306 may be correlated by well and by depth in some embodiments, such that a correspondence between formation evaluation data and historical drilling mechanics data at different locations in each well can be determined.

Train model component 302 may generate from the collected historical data 304, 306 a formation evaluation prediction machine learning model 308, e.g., using various machine learning algorithms suitable for training a model from a training set of the aforementioned historical data 304, 306. In some embodiments the machine learning model may include one or more neural networks, including, for example, various types of Generative Adversarial Networks (GANs). In other embodiments, however, various other machine learning models and/or algorithms may be used, including various types of supervised machine learning approaches (e.g., gradient boost trees, multilayer perceptron, etc.), various types of unsupervised machine learning approaches (e.g., grouping, clustering, etc.), various types of automated alignment approaches (e.g., statistical pattern capturing), etc. It will be appreciated that the training of a machine learning model from a training set may be performed in various manners in different embodiments, and may include validation of the model using a subset of the data from the training set. As such, the invention is not limited to GANs in some embodiments.

Model 308 may then be used by a formation evaluation prediction component 310, which receives as input real-time drilling mechanics data collected during drilling of a new well. Component 310 may then output synthesized formation evaluation data 314, e.g., one or more synthesized LWD logs and/or one or more predicted formation tops, based upon the real-time mechanics data. Based upon the synthesized formation evaluation data, various physical actions may be undertaken, e.g., as illustrated by block 316, for well planning purposes, or as illustrated by block 318, for drilling control purposes. Well planning may include, for example, determining a wellbore trajectory, determining casing placement, determining completions, predicting potential drilling risks, designing sections, determining drilling fluids, etc. Drilling control may include, for example, steering a drill, varying one or more operational parameters during drilling, optimizing drilling parameter settings, etc. Other suitable uses of formation evaluation data will be understood by those skilled in the art having the benefit of the instant disclosure, including uses associated with various stages of reservoir exploration, development and/or production.

Figure 4:
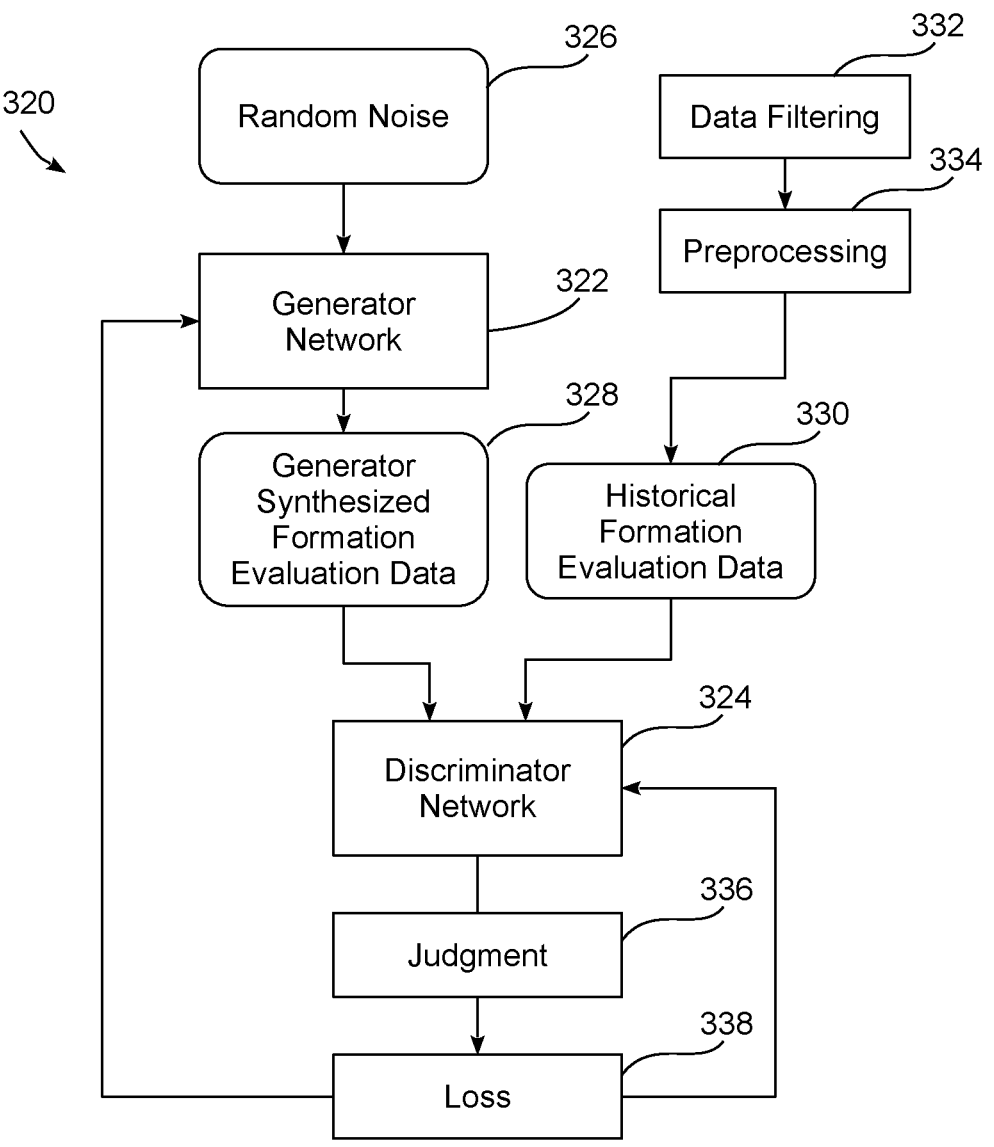
FIG. 4 illustrates a block diagram of an unconditional GAN machine learning model for synthesizing formation evaluation data, according to an embodiment.
Figure 5:
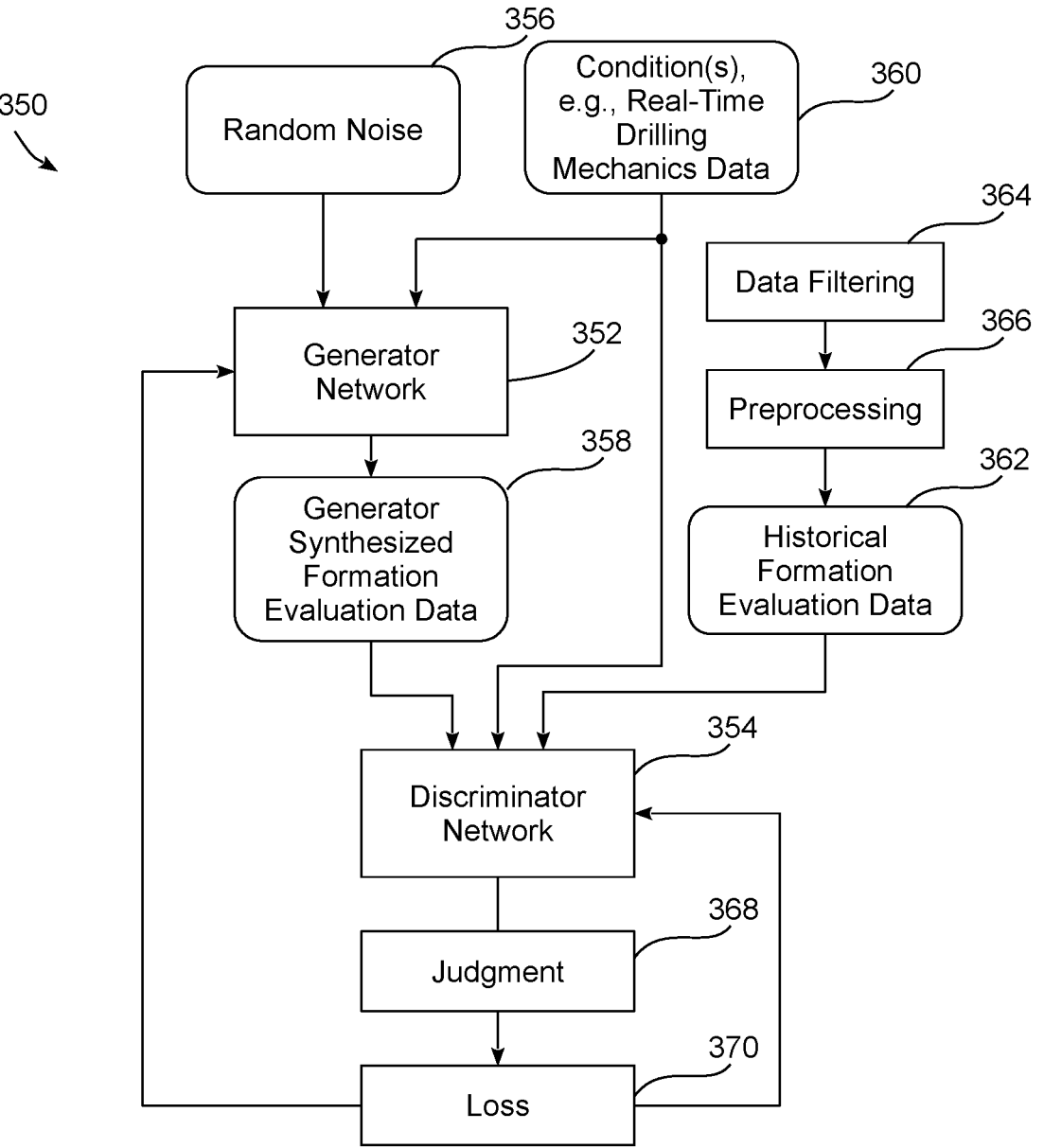
FIG. 5 illustrates a block diagram of a conditional GAN machine learning model for synthesizing formation evaluation data, according to an embodiment.

Now turning to FIGS. 4 and 5, in some embodiments a Generative Adversarial Network (GAN) may be used to synthesize formation evaluation data for a well based upon formation evaluation data associated with one or more similar wells, e.g., one or more offset wells located in the proximity of the well, and in some instances based also on drilling mechanics data collected during drilling of the well. In particular, it will be understood that in the oil and gas industry, formation evaluation data such as in the form of well logs are measurements instead of predictable signals due to the unexpectable heterogeneity of the subsurface, and GANs may be used in some embodiments to digitally generate or synthesize log data and other formation evaluation data, and in many instances, to enable drilling to be performed without the use of downhole logging tools.

In the embodiments discussed below, for example, a GAN may be used to digitally synthesize a gamma ray log for a well without performing direct measurement with a downhole gamma ray logging tool. In some instances, the GAN may use and/or be trained using gamma ray logs and/or other formation evaluation data collected and/or synthesized for one or more similar wells, e.g., one or more offset wells located in proximity to the well for which the gamma ray log is synthesized. Further, in some embodiments, additional data, e.g., drilling mechanics data collected during drilling of the well and/or drilling mechanics data collected for one or more of the similar wells, may additionally be used to train and/or use the GAN. It will be appreciated, however, that while gamma ray logs are used in the examples discussed hereinafter, the invention is not so limited, and the techniques described herein may be used to synthesize other types of formation evaluation data in other embodiments, including other logs and/or formation tops (among others).

Generative Adversarial Network (GAN) is an advanced machine learning technology capable of (1) capturing the patterns in a dataset to reproduce it, and (2) preserving variability for generating something new from the dataset and patterns. Due in part to both the patterns and the intrinsic heterogeneity of the subsurface, it is therefore believed that GANs are well suited for synthesizing gamma ray logs and other formation evaluation data based upon the data collected from similar wells, e.g., one or more nearby offset wells. Various GAN architectures may be used in various embodiments, and two types of GAN architectures, an unconditional (sometimes referred to as vanilla) Generative Adversarial Network (UGAN) and a conditional Generative Adversarial Network (CGAN), are discussed further herein. It will be appreciated, however, that other GAN architectures may be used in other embodiments, e.g., a Wasserstein Generative Adversarial Network (WGAN) or a Deep Convolutional Generative Adversarial Network (DCGAN), among others.

Thus, in various embodiments, to predict a gamma ray log for an unknown well from existing measurements, a GAN may be used to effectively understand the patterns of the gamma ray logs and intrinsic heterogeneities observed in the similar wells. Also, in some embodiments, the latent relationships of the gamma ray logs with drilling mechanics data such as rate of penetration (ROP), surface weight on bit (SWOB) may also be captured. In some embodiments, for example, for an unknown well, offset well data may be collected based on spatial location, e.g., by using clustering algorithms. Then, using the collected data such as gamma ray logs and ROP and/or SWOB data, a GAN may be trained and thereafter used to synthesize a predicted gamma ray log. Further, in some embodiments, the synthesized gamma ray log may be used prior to drilling, e.g., for well planning purposes. In addition, in some embodiments, drilling mechanics data collected during drilling may be used to update a synthetic gamma ray log while drilling in order to reduce uncertainties in future prediction.

FIG. 4, for example, illustrates an example unconditional GAN 320 that may be used in some embodiments to synthesize a gamma ray log. GAN 320 includes a pair of neural networks, referred to as a generator network 322 and a discriminator network 324, which are pitted against one another (thus the "adversarial" terminology) in order to generate new, synthetic instances of data that can pass for real data. Generator network 322 receives a latent distribution including random noise 326 as input and outputs synthesized gamma ray logs, referred to herein as synthesized formation evaluation data 328, which are then presented to discriminator network 324, which attempts to determine whether the synthesized gamma ray logs are "real" (i.e., actual gamma ray logs) or "fake" (i.e., synthesized gamma ray logs).

Discriminator network 324 also receives as input a dataset of actual gamma ray logs 330, referred to herein as historical formation evaluation data, collected from one or more similar wells, e.g., one or more offset wells in the proximity of the well for which the gamma ray log is being synthesized. In order to generate the dataset, one or more of data filtering (block 332) and preprocessing (block 334) may optionally be performed. Data filtering may include, for example, applying a clustering or other algorithm to restrict the dataset to only include data associated with offset wells within a predetermined distance from or a predetermined relationship with the well for which the gamma ray log is being generated. Preprocessing may include, for example, performing data normalization, performing data interpolation to fill in missing gamma ray data points (e.g., using nearest neighbors), and/or performing data augmentation to generate similar gamma ray logs to those in the dataset, among other techniques.

A judgment block 336 determines if discriminator network 324 is actually falsifying an unrealistic realization from generator network 322 based on the given data, and based on the judgment, loss block 338 computes the loss, which is then used to back propagate feedback to generator and discriminator networks 322, 324 to tune the networks. As a result, generator network 322 and discriminator network 324 are trained concurrently, such that the generator network learns to convert samples from the latent distribution in such a way that they produce output gamma ray logs that cannot be distinguished from actual gamma ray logs, while the discriminator network learns to better identify when a gamma ray log presented to it is a real or fake gamma ray log, such that with both networks trained the gamma ray logs output by the generator network 322 are difficult if not possible to be determined to be fake by the discriminator network 324. In some embodiments, various optimization algorithms, including, for example, algorithms such as mini batch gradient descent (among others), may also be used to accelerate convergence. Various objective functions may also be utilized to drive training and convergence of the unconditional GAN, as will be appreciated by those of ordinary skill in the art having the benefit of the instant disclosure.

Thus, in this embodiment, actual gamma ray logs from similar wells may be used to train the unconditional GAN 320 and generate a synthesized gamma ray log, which may then be used as described above in connection with FIG. 3, e.g., for well planning, drilling control, or other purposes. In this embodiment, surface measurements such as drilling mechanics data are not used, however, so the unconditional GAN 320 may be particularly well suited for use pre-drilling, e.g., during well planning.

Now turning to FIG. 5, a conditional GAN 350 may be used in some embodiments, in particular where it is desirable to also incorporate drilling mechanics data into the synthesis of a gamma ray log, e.g., as may be desired during drilling where it may be desirable to update or refine a gamma ray log based upon drilling mechanics data collected during drilling to reduce uncertainties in future prediction. With a conditional GAN, one or more additional inputs (also referred to as conditions) may be provided to both of the generator and discriminator networks in order to teach the generator network to use the latent distribution in a more structured manner.

In this embodiment, for example, GAN 350 may include a generator network 352 and discriminator network 354, which are pitted against one another in order to generate new, synthetic instances of data that can pass for real data. Similar to generator network 322 of FIG. 4, generator network 352 receives a latent distribution including random noise 356 as input and outputs synthesized gamma ray logs, referred to herein as synthesized formation evaluation data 358, which are then presented to discriminator network 354, which attempts to determine whether the synthesized gamma ray logs are real or fake. However, generator network 352 also receives one or more conditions or parameters, e.g., real-time drilling mechanics data 360 such as surface measurements collected during drilling. In some instances, for example, ROP and/or SWOB may be used, although other drilling mechanics data, including drilling mechanics data that is not real-time, may be used in other embodiments. Further, additional conditions may also be used in some embodiments, e.g., location data that defines the relative positions of similar wells from the well for which the gamma ray log is being synthesized.

Similar to discriminator network 324 of FIG. 4, discriminator network 354 also receives as input a dataset of actual gamma ray logs 362, referred to herein as historical formation evaluation data, collected from one or more similar wells, e.g., one or more offset wells in the proximity of the well for which the gamma ray log is being synthesized. In addition, however, discriminator network 354 also receives as an additional parameter or condition the drilling mechanics data 360. Further, one or more of data filtering (block 364) and preprocessing (block 366) may optionally be performed, similar to blocks 332 and 334 of FIG. 4. A judgment block 368 and loss block 370 similar to blocks 336 and 338 of FIG. 4, back propagate feedback to generator and discriminator networks 352, 354 to tune the networks. In some embodiments, various optimization algorithms, including, for example, algorithms such as mini batch gradient descent (among others), may also be used to accelerate convergence.

Figure 6A:
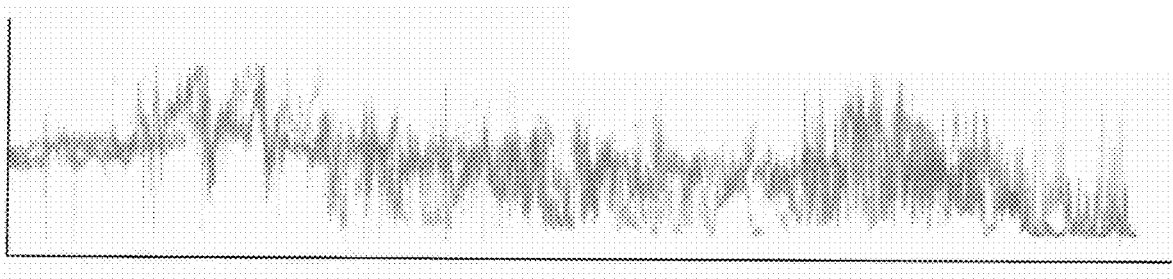
FIGS. 6A-6C illustrate distributions of example gamma ray logs, with FIG. 6A illustrating a distribution of actual gamma ray logs, FIG. 6B illustrating a distribution of synthesized gamma ray logs generated using a conditional GAN machine learning model, and FIG. 6C illustrating a distribution of synthesized gamma ray logs generated using an unconditional GAN machine learning model.
Figure 6B:
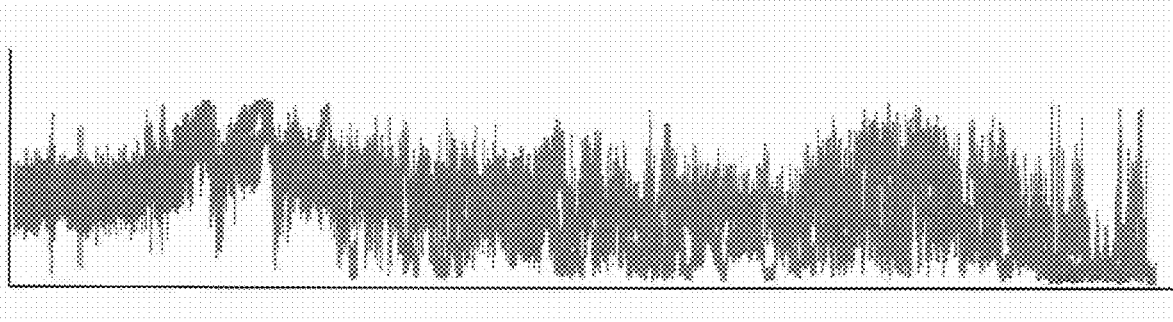
Figure 6C:
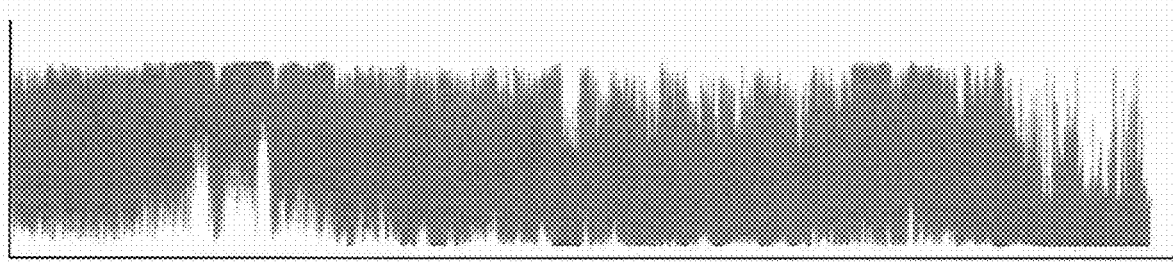

FIGS. 6A-6C and 7 next illustrate results of gamma log synthesis using example unconditional and conditional GANs as described herein. FIG. 6A, for example, illustrates a normalized distribution of five actual gamma ray logs, while FIG. 6B illustrates a normalized distribution of 500 synthesized gamma ray logs generated from a dataset including the actual gamma ray logs using a conditional GAN and FIG. 6C illustrates a normalized distribution of 500 synthesized gamma ray logs generated from the same dataset and using an unconditional GAN. For each set of synthesized gamma ray logs, the series had a length of 16376, and 3500 training records and 1500 test records were used. Normalized ROP was used as an additional condition or parameter for the conditional GAN. It should be noted that compared to the actual gamma ray logs of FIG. 6A, the CGAN results of FIG. 6B generally show well-trained patterns while preserving the intrinsic variability of the subsurface.

Figure 7:
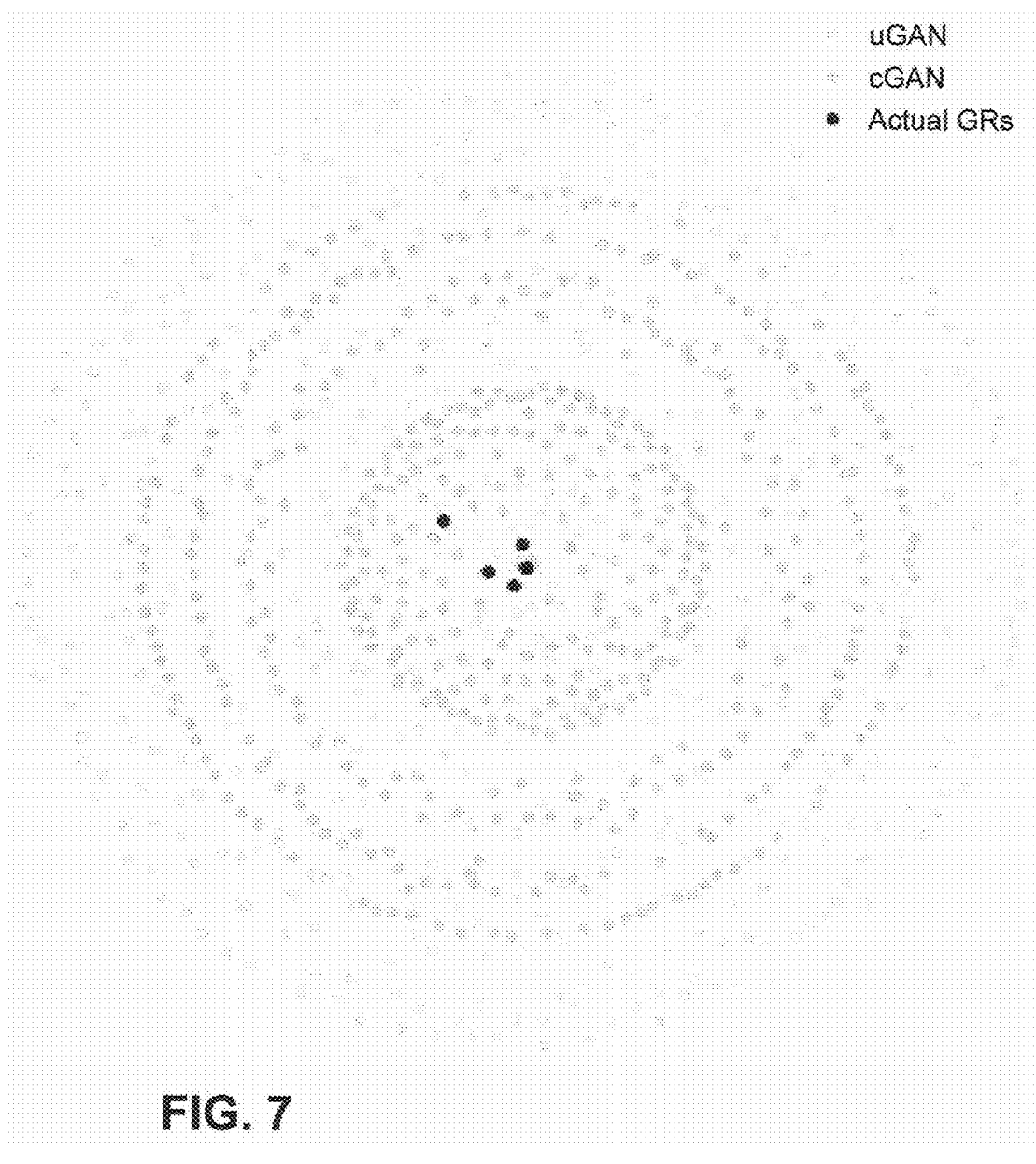
FIG. 7 illustrates a multi-Dimensional Scaling map projection for the gamma ray logs of FIGS. 6A-6C

FIG. 7 in turn illustrates a multi-dimensional scaling map projection generated from the datasets illustrated in FIGS. 6A-6C, where the distance matrix was computed by a pair-wise signal similarity using a Pearson correlation coefficient. As may be seen from FIGS. 6A-6C and 7, the synthesized gamma ray logs generated by the conditional GAN are well clustered with the actual gamma ray logs, generally capturing gamma ray patterns while preserving wide variabilities in the given data and covering all available variants. Moreover, while the conditional GAN reduces the uncertainty in gamma ray log prediction compared to the unconditional GAN, the unconditional GAN still generally tracks the patterns of the actual gamma ray logs, and thus may be useful in some applications, e.g., applications where no drilling mechanics data is available.

Figure 8:
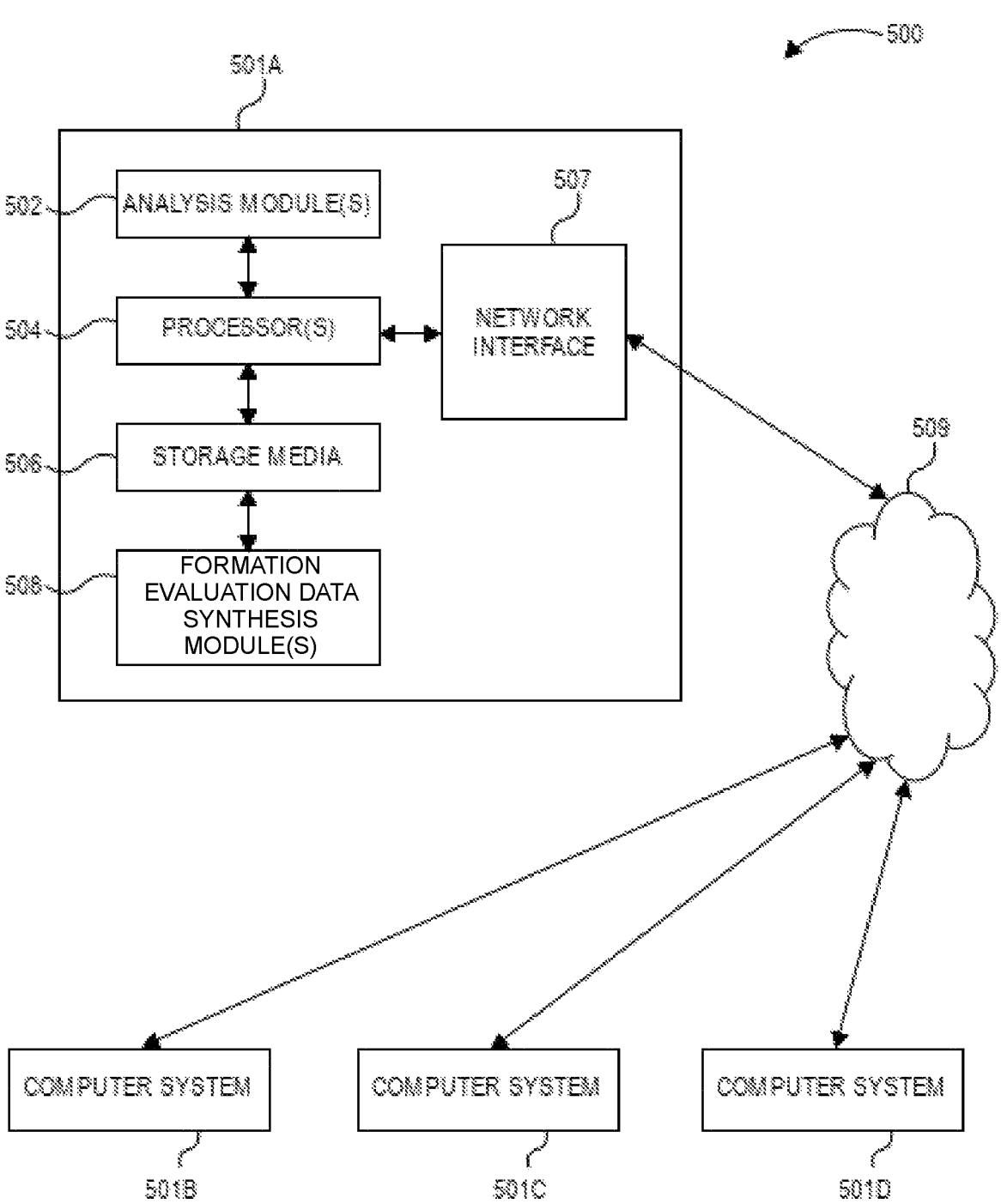
FIG. 8 illustrates a schematic view of a computing system for performing at least portions of the illustrated methods, according to an embodiment.

In some embodiments, the methods of the present disclosure may be executed by a computing system. FIG. 8 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 8 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more formation evaluation data synthesis module(s) 508 configured to perform at least a portion of the aforementioned method. It should be appreciated that computing system 500 is merely one example of a computing system, and that computing system 500 may have more or fewer components than shown, may combine additional components not depicted in the example embodiment of FIG. 8, and/or computing system 500 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 8), and/or through manual control by a user who may make determinations regarding whether a given step, action, template, model, or set of curves has become sufficiently accurate for the evaluation of the subsurface three-dimensional geologic formation under consideration.

It will be appreciated that the herein-described techniques may be deployed in some embodiments as an individual, stand-alone cloud-based application to quickly provide immediate insights for planning or ongoing operations, or as part of a holistic integrated platform for more rigorous, end-to-end optimization across the entire well life cycle. In addition, while GANs are described in certain embodiments, it will be appreciated that other machine learning approaches may be used in other embodiments. Thus, for example, in some embodiments formation evaluation data for a well may be synthesized by receiving formation evaluation data collected from one or more similar wells to the well for which formation evaluation data is to be synthesized, training a machine learning model using the received formation evaluation data, and synthesizing formation evaluation data for the well using the trained machine learning model.

Although the preceding description has been described herein with reference to particular means, materials, and implementations, it is not intended to be limited to the particular disclosed herein. By way of further example, implementations may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, implementations extend to all functionally equivalent structures, methods, uses, program products, and compositions as are within the scope of the appended claims. In addition, while particular implementations have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method comprising:
receiving drilling mechanics data collected using one or more surface sensors while drilling a well;
synthesizing formation evaluation data for the well from the drilling mechanics data by processing the drilling mechanics data with a trained machine learning model having been trained using historical drilling mechanics data and historical formation evaluation data collected from one or more similar wells to generate synthesized formation evaluation data, wherein the trained machine learning model includes a generative adversarial network (GAN) machine learning model, wherein the GAN machine learning model includes a generator network and a discriminator network, wherein the generator network receives random noise as an input and generates synthetic formation evaluation data and the discriminator network receives the synthetic formation evaluation data generated by the generator network and the historical formation evaluation data as having been filtered via a filtering operation or preprocessed via a preprocessing operation; and
controlling drilling of the well using the synthesized formation evaluation data by steering a drill, varying one or more operational parameters during drilling, or optimizing drilling parameter settings based upon the synthesized formation evaluation data.

2. The method of claim 1, wherein the drilling mechanics data includes at least one of a rate of rotation of a drill string, a torque exerted on the drill string, a rate of penetration, a weight on a drill bit, a depth of the drill bit, a surface torque, or a surface revolutions per minute.

3. The method of claim 1, wherein synthesizing the formation evaluation data includes at least one of synthesizing one or more logging while drilling (LWD) logs or synthesizing one or more formation tops.

4. The method of claim 1, wherein synthesizing the formation evaluation data includes at least one of synthesizing pressure, temperature, wellbore trajectory, resistivity, porosity, density, inclination, fluid composition, mineral composition, elemental capture spectroscopy, imaging, lithology, permeability, sonic velocity, or gamma ray data.

5. The method of claim 1, further comprising drilling the well without collecting real-time data from a logging while drilling (LWD) tool.

6. The method of claim 1, wherein the trained machine learning model includes one or more trained neural networks.

7. The method of claim 1, wherein the GAN machine learning model includes a conditional GAN, and wherein the conditional GAN receives the drilling mechanics data as a condition.

8. The method of claim 1, further comprising performing well planning using the synthesized formation evaluation data.

9. The method of claim 1, wherein the filtering operation comprises applying a clustering or other algorithm to restrict the historical formation evaluation data to only include data associated with offset wells within a predetermined distance from the well or as having a predetermined relationship with the well, and wherein the preprocessing operation comprises at least one of performing normalization, performing data interpolation to fill in missing data points, or performing data augmentation on the historical formation evaluation data.

10. A method comprising:
receiving historical drilling mechanics data and historical formation evaluation data from one or more wells;
training a machine learning model using the historical drilling mechanics data and the historical formation evaluation data to generate a trained machine learning model, wherein the trained machine learning model includes a generative adversarial network (GAN) machine learning model, wherein the GAN machine learning model includes a generator network and a discriminator network, wherein the generator network receives random noise as an input and generates synthetic formation evaluation data and the discriminator network receives the synthetic formation evaluation data generated by the generator network and the historical formation evaluation data as having been filtered via a filtering operation or preprocessed via a preprocessing operation;
receiving drilling mechanics data collected using one or more surface sensors while drilling a well;
synthesizing formation evaluation data for the well from the drilling mechanics data collected using the one or more surface sensors by processing the drilling mechanics data collected using the one or more surface sensors with the trained machine learning model; and
controlling drilling of the well using the synthesized formation evaluation data by steering a drill, varying one or more operational parameters during drilling, or optimizing drilling parameter settings based upon the synthesized formation evaluation data.

11. The method of claim 10, wherein the filtering operation comprises applying a clustering or other algorithm to restrict the historical formation evaluation data to only include data associated with offset wells within a predetermined distance from the well or as having a predetermined relationship with the well, and wherein the preprocessing operation comprises at least one of performing normalization, performing data interpolation to fill in missing data points, or performing data augmentation on the historical formation evaluation data.

12. A method comprising:
receiving historical formation evaluation data collected from one or more similar wells to a well for which formation evaluation data is to be synthesized;
training a generative adversarial network (GAN) machine learning model using the historical formation evaluation data to generate a trained GAN machine learning model, wherein the GAN machine learning model includes a generator network and a discriminator network, wherein the generator network receives random noise as an input and generates synthetic formation evaluation data and the discriminator network receives the synthetic formation evaluation data generated by the generator network and the historical formation evaluation data as having been filtered via a filtering operation or preprocessed via a preprocessing operation;
synthesizing the formation evaluation data for the well using the trained GAN machine learning model; and
controlling drilling of the well using the synthesized formation evaluation data by steering a drill, varying one or more operational parameters during drilling, or optimizing drilling parameter settings based upon the synthesized formation evaluation data.

13. The method of claim 12, wherein training the GAN machine learning model includes training the GAN machine learning model further using historical drilling mechanics data.

14. The method of claim 13, comprising receiving drilling mechanics data collected using one or more surface sensors while drilling the well.

15. The method of claim 14, wherein the GAN machine learning model is a conditional GAN, and wherein the drilling mechanics data is provided as a condition to the conditional GAN.

16. The method of claim 14, wherein the drilling mechanics data includes at least one of a rate of rotation of a drill string, a torque exerted on the drill string, a rate of penetration, a weight on a drill bit, a depth of the drill bit, a surface torque, or a surface revolutions per minute.

17. The method of claim 12, wherein synthesizing the formation evaluation data includes synthesizing one or more logging while drilling (LWD) logs.

18. The method of claim 12, wherein synthesizing the formation evaluation data includes at least one of synthesizing pressure, temperature, wellbore trajectory, resistivity, porosity, density, inclination, fluid composition, mineral composition, elemental capture spectroscopy, imaging, lithology, permeability, sonic velocity, or gamma ray data.

19. The method of claim 12, wherein the GAN machine learning model is a conditional GAN, and each of the generator network and the discriminator network receives drilling mechanics data collected using one or more surface sensors while drilling the well.

20. The method of claim 12, wherein the one or more similar wells includes a plurality of offset wells proximate to the well for which the formation evaluation data is to be synthesized.

21. The method of claim 12, wherein the filtering operation comprises applying a clustering or other algorithm to restrict the historical formation evaluation data to only include data associated with offset wells within a predetermined distance from the well or as having a predetermined relationship with the well, and wherein the preprocessing operation comprises at least one of performing normalization, performing data interpolation to fill in missing data points, or performing data augmentation on the historical formation evaluation data.

* * * * *